US005899380A

United States Patent [19]

Beaulieu

[11] Patent Number: 5,899,380

[45] Date of Patent: May 4, 1999

[54] TRACTION AID FOR VEHICLES

[76] Inventor: René Beaulieu, 2055 Laviolette, Drummondville, Quebec, Canada, J2B 7C2

[21] Appl. No.: 08/979,070

[22] Filed: Nov. 26, 1997

[30] Foreign Application Priority Data

Nov. 26, 1996 [CA] Canada .................................. 2191256

[51] Int. Cl.[6] ...................................................... E01B 23/00

[52] U.S. Cl. ................................................................ 238/14

[58] Field of Search ................................. 238/14; 404/35

[56] References Cited

U.S. PATENT DOCUMENTS

| | | | |
|---|---|---|---|
| 1,449,020 | 3/1923 | Teasley et al. | 238/14 |
| 2,422,006 | 6/1947 | Friedman | 238/14 |
| 3,152,761 | 10/1964 | Vaughan, Jr. et al. | 238/14 |
| 3,350,013 | 10/1967 | Bergquist | 238/14 |
| 3,701,474 | 10/1972 | Welz | 238/14 |
| 4,278,203 | 7/1981 | Martin | 238/14 |
| 5,439,171 | 8/1995 | Fruend | 238/14 |
| 5,509,231 | 4/1996 | Marcoux | 47/58 |

*Primary Examiner*—S. Joseph Morano
*Attorney, Agent, or Firm*—Eric Fincham

[57] ABSTRACT

There is provided a traction device which is comprised of a mat having a pair of opposed major faces with a plurality of apertures extending between the major faces and a length of chain threaded through the apertures such that successive adjacent segments of the chain lie adjacent opposite major faces. One or more mats may be employed to achieve a desired length with the mats being foldable The traction device is inexpensive to manufacture while being compact.

11 Claims, 4 Drawing Sheets

TRACTION AID FOR VEHICLES

FIELD OF THE INVENTION

The present invention relates to a traction device for use with automotive vehicles and trucks and more particularly, relates to a traction device of the type to be engaged under a vehicle wheel.

BACKGROUND OF THE INVENTION

The use of traction devices is known in the art and a number of such devices are commercially available. The devices are utilized when a vehicle needs additional traction such as when it is in a rut and conditions are slippery.

One of the more popular commercial models has been the expanded metal type such as shown in U.S. Pat. No. 4,278,203. Such devices comprise one or more sections of expanded metal. Other types of devices proposed in the art have included mats having cleats or other traction assisting members on one or more faces of the mat.

SUMMARY OF THE INVENTION

It is an object of the present invention to provide a traction device which is portable, flexible and inexpensive to manufacture.

According to one aspect of the present invention, there is provided a traction device comprising a mat having a pair of opposed major faces, a plurality of apertures extending between the major faces, and at least one length of chain threaded through said apertures such that successive adjacent segments of the chain lie adjacent opposite major faces.

The device, as above mentioned, includes a mat which may assume a number of different configurations. In general terms, and as is conventional in the art, the mat would have a substantially rectangular configuration with a width which approximates or is larger than the width of the vehicle wheel with which the device is to be used. The length of the device may vary and in a preferred embodiment, the device is formed of a plurality of mats which are connected together.

The mat may be formed of any suitable material and to this end, in a preferred embodiment, it is formed of a somewhat flexible material such as rubber. Conveniently, the device may be formed of a recycled rubber material.

The apertures extending between the major faces are sized to receive the chain as it is threaded therethrough. A number of different arrangements of apertures are possible. Thus, there may be provided a single set of apertures aligned in a longitudinal direction or alternatively, a plurality of sets of apertures, each set being aligned longitudinally, may be employed. In such an instance, the apertures would preferably be offset with respect to each other.

Alternatively, the chain may be threaded in a fashion such that it extends diagonally with respect to the length and width of the mat.

The chain which is threaded through the apertures may be selected from many known types of chains. The term chain includes any suitable member having the desired traction properties The individual links may simply be oval in configuration or alternatively, the chain may be of the type having protrusions extending therefrom to provide added grip.

In a preferred embodiment, the device will include a tongue portion to aid the user in placing the device under or in proximity to a vehicle tire and to draw the device under the wheel.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
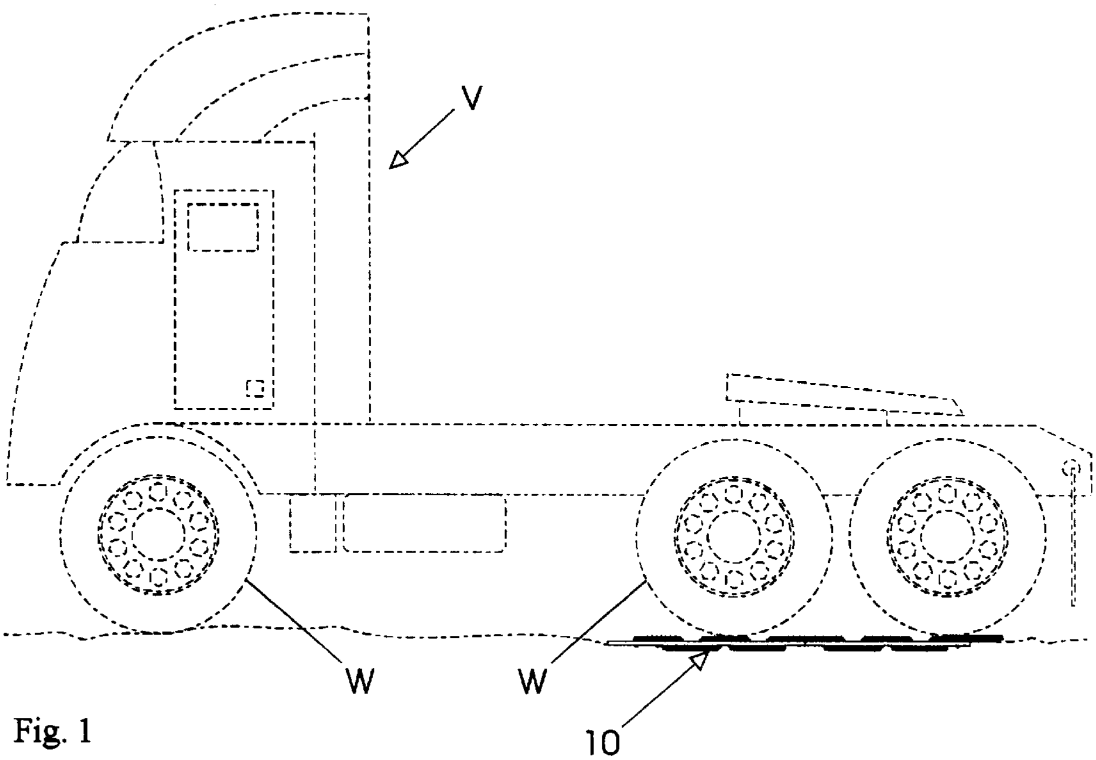
FIG. 1 is a side view illustrating use of the traction device of the present invention with a vehicle.
Figure 2:
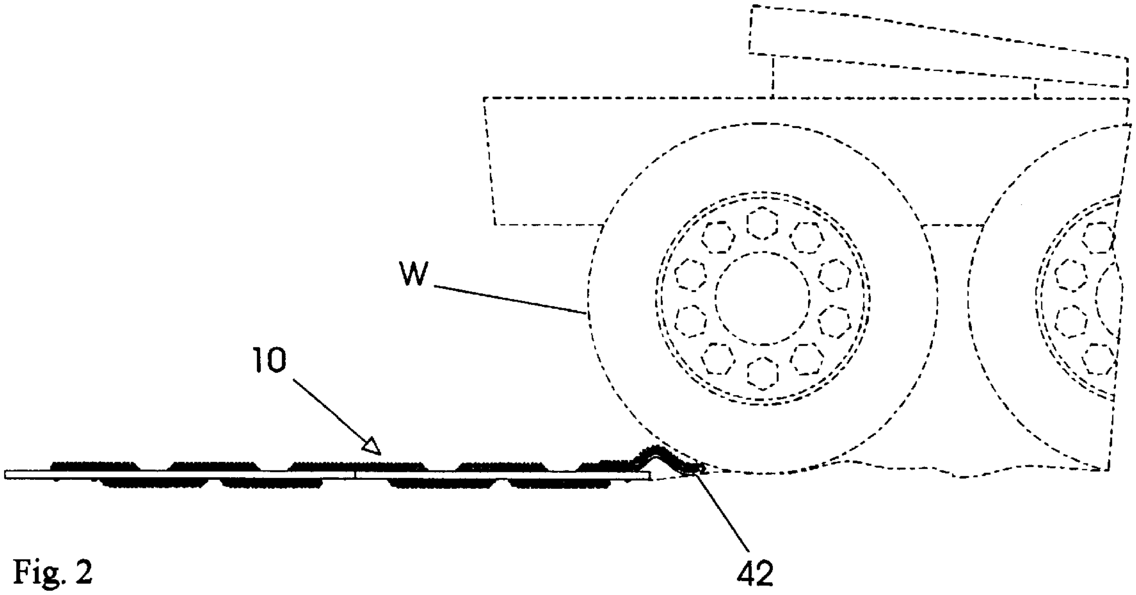
FIG. 2 is an enlarged view showing placement of the traction device under the vehicle wheel.
Figures 3, 4, 5, 6:
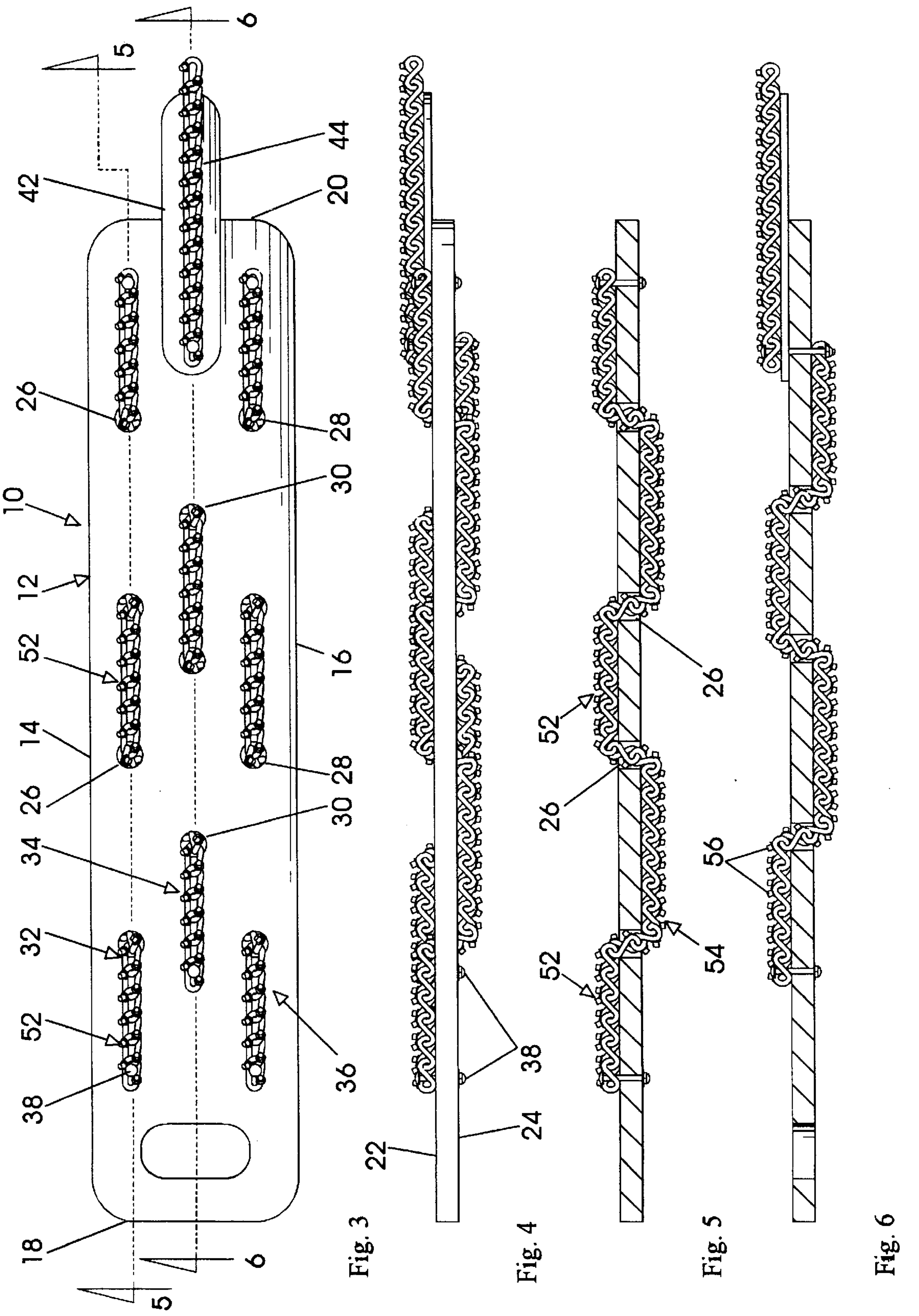
FIG. 3 is a top plan view of a traction device according to one embodiment of the present invention.
FIG. 4 is a side elevational view of the traction device of FIG. 3.
FIG. 5 is a sectional view taken along the line 5—5 of FIG. 3.
FIG. 6 is a sectional view taken along the line 6—6 of FIG. 3.

Referring to the drawings in greater detail and by reference characters thereto, there is illustrated in FIG. 1 a vehicle V having wheels W and using the traction device which is generally designated by reference numeral 10.

One version of traction device 10 is illustrated in greater detail in FIGS. 3 to 6 and these figures will now be referred to.

Traction device 10, in the embodiment illustrated in FIGS. 3 to 6, comprises a mat 12 of a generally elongated substantially rectangular configuration having first and second opposed parallel sides 14 and 16 which terminate in ends 18 and 20. Mat 12 has a first major face 22 and a second opposed major face 24.

Extending between major faces 22 and 24 are a plurality of apertures with a first set of generally longitudinally aligned outer set of apertures being designated by reference numeral 26. As will be noted, apertures 26 are proximate first side 14 and generally parallel thereto. A second set of apertures generally designated by reference numeral 28 also are aligned in a longitudinal direction and extend adjacent side 16. It will be noted that apertures 26 and 28 are spaced apart from each other in a manner which is substantially identical.

A third set of apertures designated by reference numeral 30 also extend in a longitudinally aligned manner intermediate apertures 26 and 28. In this respect, it will be noted that apertures 30 are offset with respect to their location compared to apertures 26 and 28.

The traction device 10 includes a first chain 32 which is threaded through the apertures 26 such that a first chain segment 52 will lie adjacent to first major surface 22 and a subsequent adjacent chain segment 54 lies adjacent major face 24. This continues for the length of chain 32.

At each end, chain 32 is attached to mat 12 by means of a stud 38 which extends through mat 12 between major faces 22 and 24. Any suitable stud including a bolt type member such as a carriage bolt with associated washer may be utilized.

A second chain 36 is threaded through apertures 28 in a manner substantially identical to that of chain 32 with respect to apertures 26. Similarly, a middle chain 34 extends through apertures 30; in this respect, it will be noted that chain 34 has segments which are offset with respect to segments 52 and 54 due to the location of apertures 30. In other words, the term "offset" means that the segments of chain 30 on either face 22 or 24 are not aligned (in a transverse direction) with the segments of chains 32 and 34.

At end 18, mat 12 is provided with an aperture generally designated by reference numeral 40 which is provided for the purpose of permitting easy transport of traction device 10.

At end 20, traction device 10 has a tongue portion generally designated by reference numeral 42 which is of a substantially narrower width compared to mat 12. As may be best seen in FIG. 6, a chain segment 44 extends along one side of tongue 42.

Figure 11:
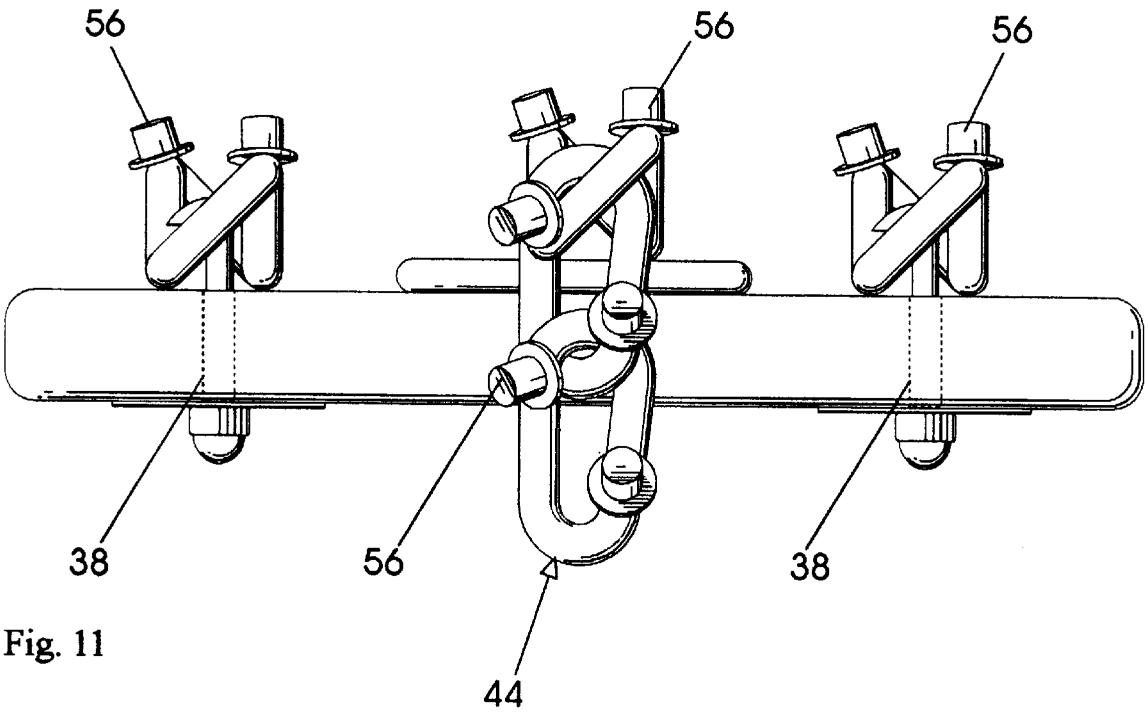
FIG. 11 is an end elevational view of the device of FIG. 3.

In the embodiment illustrated in FIGS. 3 to 6, and as best seen in FIG. 11, chains 32, 34 and 36 and stud 38 are of the type having protrusions 56 extending outwardly therefrom to provide added grip.

Figure 7:
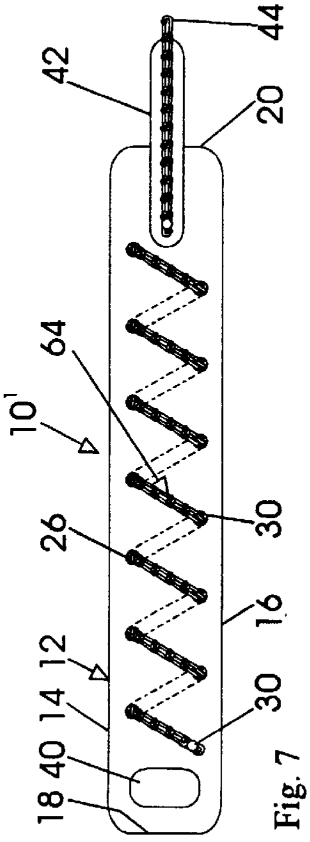
FIG. 7 is a top plan view of a further embodiment of the present invention.

Turning to the embodiment of FIG. 7, there is illustrated a traction device 10' having many components in common with traction device 10 and thus similar reference numerals will be employed for similar components.

Traction device 10' includes a mat 12 having opposed sides 14, 16 and ends 18, 20. Extending between major faces 22 and 24 are first apertures 26 and second apertures 28, each being aligned in a generally longitudinal direction. However, in this embodiment, there is provided a single chain 64 which is threaded through apertures 26 and 28 in a manner such that chain 64 will first extend through an aperture 26 and then through an aperture 28 in a threaded diagonal manner.

Traction device 10 may also include handle aperture 40 and tongue 42.

Figure 8:
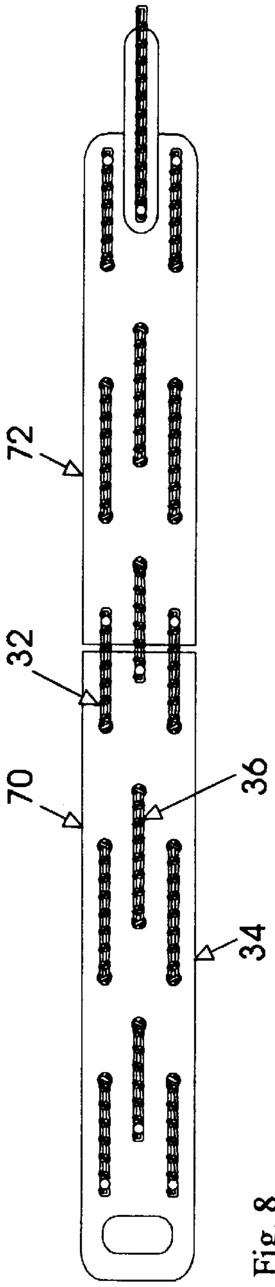
FIG. 8 is a top plan view of an embodiment employing two sections.

In the embodiment of FIG. 8, there is provided a traction device which has a pair of mats 70 and 72. Mats 70 and 72 lie in an end to end relationship and chains 32, 34 and 36 extend continuously in a longitudinal direction. This embodiment is used for some trucks such as shown in FIG. 1.

Figure 9:
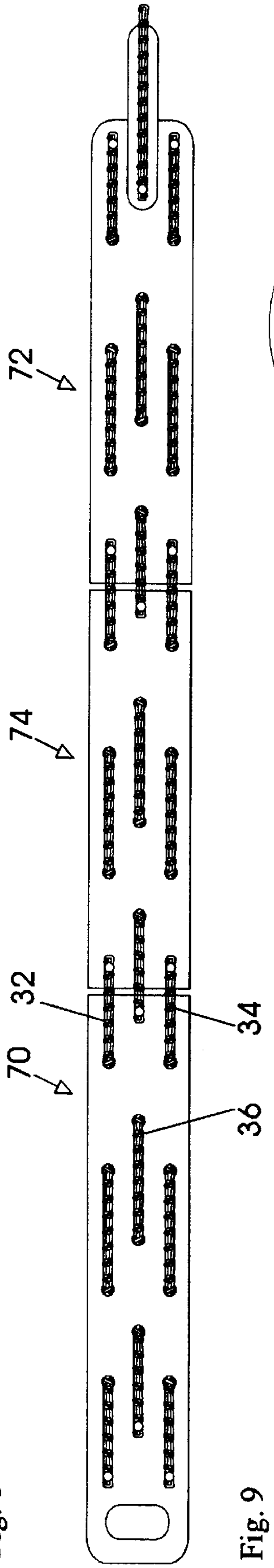
FIG. 9 is a top plan view of a further embodiment illustrating the use of three sections.
Figure 10:
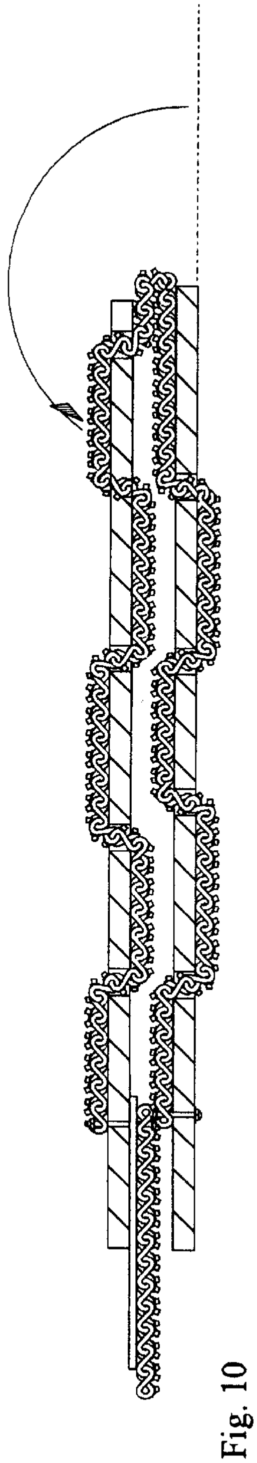
FIG. 10 is a side elevational view of the embodiment of FIG. 8 when in a folded condition.

In the embodiment of FIG. 9, three such mats 70, 72 and 74 are utilized. As shown in FIG. 10, the mats may be folded on top of each other to provide for compact storage.

It will be understood that the above described embodiments are for purposes of illustration only and that changes and modifications may be made thereto without departing from the spirit and scope of the invention.

I claim:

1. A traction device comprising a mat having first and second opposed major faces, first and second sets of apertures extending between said major faces, each of said first and second sets of apertures extending generally from a first end of said mat towards a second end thereof, a first length of chain threaded through said first set of apertures such that successive adjacent segments of said first length of chain lie adjacent to alternating major faces of said mat, a second length of chain threaded through said second set of apertures such that successive adjacent segments of said second length of chain lie adjacent to alternating major faces of said mat, said first and second lengths of chain being threaded such that a segment of said first length of chain on said first face is offset with respect to a segment of said second length of chain on said first face.

2. The traction device of claim 1 wherein each of said first and second lengths of chain lie in a substantially parallel plane with respect to each other.

3. The traction device of claim 2 wherein each of said first and second sets of apertures extend in a generally straight line.

4. The traction device of claim 1 including a plurality of said mats, said mats being interconnected in an end to end relationship by means of said first and second lengths of chain.

5. The traction device of claim 1 further including means to secure the ends of each of said lengths of chain to said mat.

6. The traction device of claim 1 wherein said mat is formed of a recycled rubber.

7. The traction device of claim 1 further including a tongue located at one end of said mat.

8. The traction device of claim 1 further including means located at one end of said mat for carrying said mat.

9. The traction device of claim 1 further comprising a third set of apertures extending generally from said first end of said mat towards said second end thereof, and a third length of chain threaded through said third set of apertures such that successive adjacent segments of said third length of chain lie adjacent to alternating major faces of said mat.

10. The traction device of claim 9 wherein said first length of chain and said third length of chain are located proximate first and second sides respectively of said mat, said second length of chain being located intermediate said first and third lengths of chain, said first and third lengths of chains being substantially aligned.

11. A traction device comprising a mat having first and second opposed major faces, first and second ends, and first and second sides, a plurality of apertures extending between said first and second major faces, and at least one length of chain threaded through said apertures such that successive adjacent segments of said chain lie adjacent to alternating major faces of said mat, said chain being threaded through said apertures in a zigzag configuration whereby said segments of said chain provide a traction surface on each of said first and second opposed major faces.

* * * * *